CONTINUOUSLY VARIABLE-SPEED TURNTABLE DRIVING SYSTEM

Filed Sept. 16, 1950

RALPH A. MULLANEY
*INVENTOR.*

BY Francis W. Crotty

*HIS ATTORNEY*

Patented Oct. 28, 1952

2,615,342

UNITED STATES PATENT OFFICE 2,615,342

CONTINUOUSLY VARIABLE-SPEED TURNTABLE DRIVING SYSTEM

Ralph A. Mullaney, Elmwood Park, Ill., assignor to Zenith Radio Corporation, a corporation of Illinois Application September 16, 1950, Serial No. 185,180

9 Claims. (Cl. 74—200)

This invention relates to an improved driving system for a phonograph turntable and more particularly to a system for driving a turntable at a speed which is continuously adjustable over a wide range or which may quickly and conveniently be established at any selected value within that range.

Multi-speed turntable driving sysems are now essential to phonograph apparatus intended for use in the home because records are currently being sold for reproduction at 78, 45 and 33⅓ revolutions per minute. Arrangements have been proposed in which the rotational speed of the turntable may be preset to any of those three values even though no continuous adjustment over a range of speeds including those values is made available. Such arrangements are not as acceptable as one featuring a continuous speed variation for several reasons. For example, they are inflexible and are able to accommodate only the records that are commercially available at the present time. They include no provisions for handling records that may require still a fourth reproduction speed and such records may conceivably be introduced at a future date. Moreover, they do not permit the user to make very slight variations in operating speed to satisfy his own preference as to the manner of reproduction.

Other arrangements are known in which the turntable speed is variable over a wide range but they are intended primarily for commercial, as distinguished from home, use. These other arrangements comprise a turntable positioned above and in coaxial alignment with a flywheel that is mechanically connected to the turntable for rotation therewith. Another disc, parallel to the flywheel and rotated at constant speed by a suitable motor, is supported for rotation about an axis radially displaced from the flywheel axis and a movable idler interposed between the flywheel and driver disc completes the driving chain and determines the operating speed in accordance with its position. Usually, the idler is supported from a shaft so that its position and the speed of rotation may be continuously adjustable.

Such arrangements as heretofore constructed are too costly to be included in phonograph apparatus for home use. This is apparent when it is recognized that the adjacent surfaces of the flywheel and driving disc must be accurately machined to a high degree of parallelism to obtain a satisfactory coupling therebetween for all positions of the idler. Moreover, irregularities in these surfaces introduce extraneous turntable vibrations which are detrimental to high-quality record reproduction. For like reasons, the other components of the driving system have to be carefully machined and, consequently, the fabricating expense is high.

It is an object of this invention, therefore, to provide an improved turntable driving system which overcomes one or more of the afore-mentioned objections of the prior arrangement.

A further object of this invention is to provide a continuously variable speed turntable driving system which is comprised of simple component elements and is, therefore, inexpensive to construct although high standards of performance are maintained.

In accordance with the invention, a driving system for a phonograph turntable comprises a driving disc positioned parallel to the turntable for rotation about an axis disposed radially of the axis of rotation of the turntable and supported for axial displacement. An idler wheel is interposed between the adjacent surfaces of the turntable and the disc and a movable carriage supporting the idler at one end has an elongated track-engaging member at its opposite end. The system further includes an elongated track member which provides a path of movement for the carriage such that the idler wheel travels substantially in a plane including the axes of rotation of the turntable and the disc. One of these members has a V-shaped portion and the other has an edge portion received by the V-shaped portion to permit pivotal movement of the carriage with respect to the track. Resilient means are provided for urging the disc along its axis to complete and maintain a driving connection to the turntable through the idler wheel. Means for selectively displacing the idler carriage along the track member are included in the system for controlling the rotational speed of the turntable.

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which:

Figures 1, 2, 3, 4:
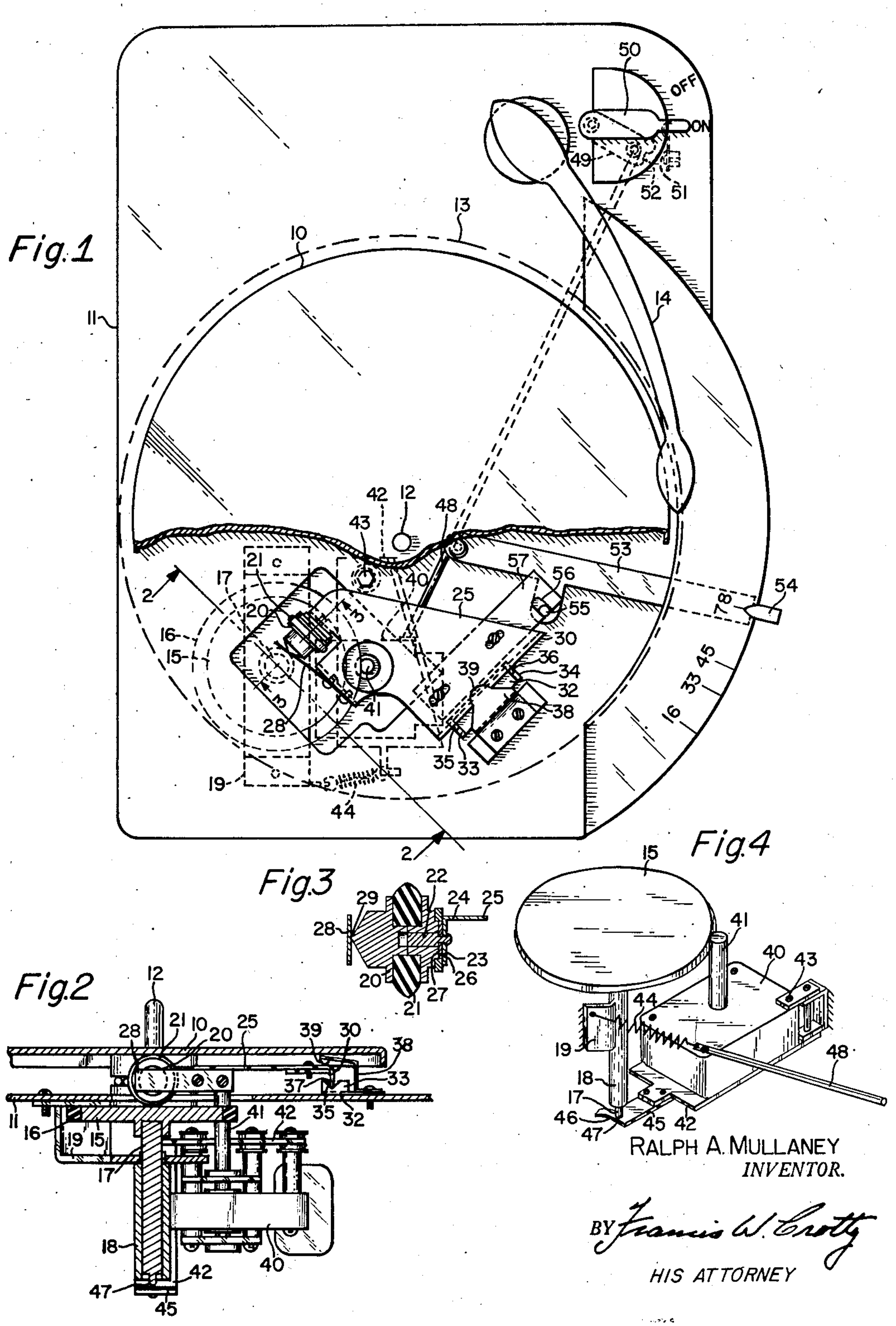
Figure 1 is a plan view of a phonograph including a turntable driving system embodying the present invention, a portion of the turntable being shown broken away to reveal the driving system.
Figure 2 is a sectional view taken along line 2—2 of Figure 1.
Figure 3 is an enlarged, sectional view taken along line 3—3 of Figure 1.
Figure 4 is a functional representation of a portion of the apparatus shown in Figures 1 and 2.

Referring now to Figure 1 of the drawing, the phonograph there shown includes a turntable 10 supported for rotation by a mounting base 11. A central spindle 12 extends upwardly from turntable 10 and a record disc 13, shown in dash-dot outline, is centered thereby on the turntable. A tone arm 14 is movably supported at one end in conventional fashion on base 11 whereby the stylus (not shown) is engageable with the groove of record disc 13.

As may be more clearly seen in Figure 2, a driving disc 15, provided with a peripheral rubber rim 16, is positioned below and parallel to turntable 10, being affixed to one end of a shaft 17 that is supported for rotational and axial displacement within a bearing member 18. The bearing member 18 is supported below base 11 by means of a U-shaped bracket 19 and is so disposed that the rotational axis of disc 15 and shaft 17 is displaced laterally of the axis of rotation of turntable 10.

An idler wheel 20, provided with a peripheral rubber rim 21, is interposed between the adjacent surfaces of turntable 10 and disc 15 and, as may be seen in Figure 3, is supported for rotation on a stub shaft 22 affixed to a downwardly turned portion 23 at one end 24 of a movable, plate-like carriage 25. Cooperating bearing surfaces 26 and 27 are provided on stub shaft 22 and at one side of idler 20, respectively. Resilient means, such as a leaf spring 28, fixed at one end to carriage 25, engages a bearing point 29 of idler 20 and biases the idler toward bearing surface 26. This arrangement provides the means for maintaining idler 20 in a fixed axial position relative to carriage 25.

The carriage 25 includes a downwardly-projecting elongated track-engaging member 30 at the end thereof opposite end 24. An elongated track member 32 is fixed to base 11 in the vicinity of member 30 and provides a path of movement for the carriage 25 such that idler wheel 20 travels substantially in a plane including the axes of rotation of turntable 10 and disc 15. Specifically, this is effected by means of a pair of upturned ears 33 and 34 at opposite ends of member 32 which are provided with respective V-shaped notch portions 35 and 36 and the elongated track member 30 has an edge portion 37 received by the V-shaped notches thus permitting pivotal movement of carriage 25 with respect to track 32. The length of carriage 25 is proportioned so that idler wheel 20 moves essentially parallel to the axis of rotation of turntable 10 with pivotal movement of the carriage and the junction of edge 37 with the V-shaped sections 35 and 36 is disposed in a plane parallel to turntable 10 and including the rotational axis of the idler wheel. The carriage is displaceable along a substantially linear path defined by sections 35 and 36 while at the same time it may pivot about an axis parallel to the axis of idler 20. Although a two-point support (notches 35 and 36) is illustrated, the track member effectively constitutes an elongated element such as may be afforded by a solid track member provided with a continuous V-shaped linear trough.

A member 38 of resilient material having an approximately Z-shaped configuration is affixed at one end to base 11. The other end is provided with a ball-like contact 39, disposed between ears 33 and 34 of member 32 in engagement with carriage 25 directly above element 30. The resilient member 38 biases the edge portion 37 of the carriage toward the apices of notches 35 and 36 to maintain a high-friction connection between the track member 32 and the track-engaging member 30.

A speed control lever 53 is pivoted at one end to base 11 and is provided with a pointer 54 arranged to travel along a speed scale inscribed on base 11. An upstanding pin 55 fixed at one end to a sidewise projection of lever 53 is disposed within a slot 56 near one end of a plate 57 which is adjustably fixed to carriage 25 through screw and slot connections as indicated. Thus, means are provided for selectively displacing carriage 25 along track member 32 to control the rotational speed of the turntable. The adjustable connection between plate 57 and carriage 25 is included so that pointer 54 may be accurately positioned relative to the indicia of the speed scale for calibrating the device.

A driving motor 40 including a drive shaft 41 is mounted on a sub-base 42. The sub-base 42 is pivoted to the under side of mounting base 11 at 43 so that the motor is movable from an inactive position to an active position in which shaft 41 is in frictional driving engagement with the periphery 16 of disc 15. This arrangement may be more clearly seen in the simplified representation of Figure 4 wherein elements corresponding to those of the other figures are identified by the same reference numerals. A spring 44 coupled between bracket 19 and sub-base 42 biases the motor about pivot 43 in a direction so that shaft 41 is urged toward the periphery of disc 15.

A resilient element, comprised of a leaf spring 45, is fixed to one extremity of sub-base 42 and is movable therewith from an inactive position to an active position in which its other extremity 46 is in engagement with the lower end 47 of shaft 17. Spring 45 is arranged to bias shaft 17 vertically to urge disc 15 along its axis and complete a driving connection to the under surface of turntable 10 through the idler 20. An inclined portion extends downward from extremity 46, as indicated, and is arranged to cam end 47 of shaft 17 upwardly when spring 45 is displaced from its inactive to its active position.

A rod 48 is hooked at one end to sub-base 42 at a point displaced from pivot 43 and extends beneath mounting base 11. The other end of rod 48 is pivoted to one end of an arm 49, the other end of which is supported for rotation with an on-off selector 50. The selector 50 is positioned on the upper side of base 11 and is mechanically coupled with the electrical switch (not shown) of the energizing circuit for motor 40. In the "on" position of element 50, shown in Figure 1, link 48 is unrestrained, whereas in the "off" position, a detent spring 51 fixed to the under side of base 11 engages detent 52 in arm 49 so that arm 49 and link 48 are maintained in a releasably locked condition. Since motor 40 and spring 45 are supported by base 42, linkage 48, 49 and 50 provides the means for simultaneously displacing the spring and the motor between their active and inactive positions.

With actuator 50 in the position shown in

Figure 1, motor 40 is in its active position and spring 44 maintains a driving connection between motor shaft 41 and the periphery of disc 15. Spring 45 is also in its active position and serves to maintain a driving connection between disc 15 and turntable 10 through idler 20. The rotational speed of disc 15 is constant, assuming of course that motor 40 rotates at constant speed, while the rotational speed of turntable 10 is dependent upon the position of idler 20 in the plane including the rotational axes of turntable 10 and disc 15. If the idler is displaced from the position shown toward the axis of disc 15, the turntable speed is reduced, whereas displacement in the opposite direction increases the turntable speed. Selective adjustment of the turntable speed in either sense may be effected by rotating arm 53 about its pivot because the mechanical connection, afforded by pin 55 and slot 56, produces a related linear movement of carriage 25 to displace idler 20 along its path of movement across disc 15.

In order to deenergize the phonograph, actuator 50 is displaced to its "off" position wherein it is maintained by engagement of detent elements 51 and 52. Such movement of member 50 displaces link 48 to pivot sub-base 42 about point 43 and carry motor shaft 41 from engagement with the periphery of disc 15. At the same time spring 45 is carried by base 42 to its inactive position and shaft 17 and disc 15 are free to drop. Thus, when the phonograph is in an inoperative condition, permanent deformation in the periphery of disc 15 and the periphery of idler 20 which might otherwise result from maintaining a driving connection between these elements is avoided.

Any irregularities which might exist in either or both the adjacent surfaces of turntable 10 and disc 15 tending to alter the spacing between these surfaces are compensated by the bias exerted by spring 45 on axially movable driving disc 15 and by the permissible lateral movement of idler wheel 20 resulting from the pivotal engagement of carriage portion 37 with the V-shaped sections of track 32. Consequently, an efficient driving connection is always maintained between the turntable and the driving disc regardless of irregularities, and extraneous turntable vibration is minimized.

As already explained, idler 20 is laterally movable along an arcuate path with pivotal movement of carriage 25. This path is effectively linear if the maximum angular displacement of the carriage is small, or if the distance between the idler and the carriage pivot point is large. The latter expedient may easily be adapted so that displacement of the idler away from the plane including the rotational axes of the turntable and disc is reduced to a negligible amount and undesirable turntable speed variations arising from such displacement are prevented. Moreover, the carriage pivot defined by sections 35 and 36 lies substantially in a plane parallel to turntable 10 and including the axis of idler 20 and the carriage pivots from this plane through essentially equal acute angles. This relationship is observed since if pivoting occurred with respect to a plane that is not parallel to the turntable undesired idler displacement is increased.

The two-point pivot support provided by V-shaped portions 35 and 36 for the carriage is effective in achieving a constancy of turntable speed for any setting of idler 20 heretofore unattainable without expensive equipment. In particular, changes in idler position as a result of the carriage "cocking" in a horizontal plane are precluded. Additionally, the high-friction connection which is maintained by spring 38 between edge 37 of the carriage and track portions 35 and 36 prevents undesirable displacement of the carriage along its track. By increasing the tension of spring 38, the friction in this connection may be increased and edge 37 seated more accurately in track sections 35 and 36, however, pivotal movement of the carriage remains relatively unrestrained since the pivot is established in a manner analogous to a knife edge.

The described driving system is composed of simple mechanical elements that do not require a high degree of skilled machining. Consequently, it is inexpensive to construct and lends itself to mass production. And yet, the system exhibits many highly desirable operating characteristics for the user's convenience. For example, the carriage 25 is continuously movable along track 32 under the control of lever 53 which enables the operating speed of turntable 10 to be continuously adjustable over a wide range of values. The limits of this range are determined by the permissible displacement of idler 20 across the top face of disc 15, the lowest operating speed being realized when the idler is closest to the axis of rotation of the disc and the highest speed being attained with the idler nearest to the periphery of the disc. It is entirely practical, using a driving disc of three inches in diameter, to achieve a speed range from ten to eighty-five revolutions per minute. If desired, stop elements may be positioned on base 11 in the vicinity of carriage 25 to engage the carriage and determine its range of movement as well as that of idler 20 in accordance with any preselected range of turntable speeds.

The continuously variable speed feature is further advantageous in that it provides the user with such a speed control that he may reproduce any record at a speed most pleasing to himself irrespective of the particular speed recommended for playing the recording. The scale inscribed on base 11 and traversed by pointed 54 is useful in aiding the quick adjustment of the phonograph to the standard speeds of 78, 45 and 33⅓ revolutions per minute or to any other preselected value.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A driving system for a phonograph turntable comprising: a driving disc positioned parallel to said turntable for rotation about an axis disposed radially of the axis of rotation of said turntable and supported for axial displacement; an idler wheel interposed between the adjacent surfaces of said turntable and said disc; a movable carriage supporting said idler wheel at one end and having an elongated track-engaging member at the opposite end; an elongated track member providing a path of movement for said carriage such that said idler wheel travels substantially in a plane including the axes of rotation of said turntable and said disc, one of said members having a V-shaped portion and the other having an edge portion received by said V-shaped portion to permit pivotal movement of said carriage with respect to said track; resilient means urging said disc along its axis to complete a driving connection to said turntable through said idler wheel; and means for selectively displacing said carriage along said track member to control the rotational speed of said turntable.

2. A driving system for phonograph turntable comprising: a driving disc positioned parallel to said turntable for rotation about an axis disposed radially of the axis of rotation of said turntable and supported for axial displacement; an idler wheel interposed between the adjacent surfaces of said turntable and said disc; a movable carriage supporting said idler wheel at one end and having an elongated track-engaging member at the opposite end; means for maintaining said idler wheel in a fixed axial position relative to said carriage; an elongated track member providing a path of movement for said carriage such that said idler wheel travels substantially in a plane including the axes of rotation of said turntable and said disc, one of said members having a V-shaped portion and the other having an edge portion received by said V-shaped portion to permit pivotal movement of said carriage with respect to said track; resilient means urging said disc along its axis to complete a driving connection to said turntable through said idler wheel; and means for selectively displacing said carriage along said track member to control the rotational speed of said turntable.

3. A driving system for a phonograph turntable comprising: a driving disc positioned parallel to said turntable for rotation about an axis disposed radially of the axis of rotation of said turntable and supported for axial displacement; an idler wheel interposed between the adjacent surfaces of said turntable and said disc; a movable carriage supporting said idler wheel at one end and having an elongated track-engaging member at the opposite end; means for maintaining said idler wheel in a fixed axial position relative to said carriage including cooperating bearing surfaces on said carriage and on one side of said idler and resilient means biasing said idler in a direction toward said bearing surface of said carriage; an elongated track member providing a path of movement for said carriage such that said idler wheel travels substantially in a plane including the axes of rotation of said turntable and said disc, one of said members having a V-shaped portion and the other having an edge portion received by said V-shaped portion to permit pivotal movement of said carriage with respect to said track; resilient means urging said disc along its axis to complete a driving connection to said turntable through said idler wheel; and means for selectively displacing said carriage along said track member to control the rotational speed of said turntable.

4. A driving system for a phonograph turntable comprising: a driving disc positioned parallel to said turntable for rotation about an axis disposed radially of the axis of rotation of said turntable and supported for axial displacement; an idler wheel interposed between the adjacent surfaces of said turntable and said disc; a movable carriage supporting said idler wheel at one end and having an elongated track-engaging member at the opposite end; an elongated track member providing a path of movement for said carriage such that said idler wheel travels substantially in a plane including the axes of rotation of said turntable and said disc, one of said members having a V-shaped portion and the other having an edge portion received by said V-shaped portion to permit pivotal movement of said carriage with respect to said track, and the length of said carriage being proportioned so that said idler wheel moves essentially parallel to the axis of rotation of said turntable with pivotal movement of said carriage; resilient means urging said disc along its axis to complete a driving connection to said turntable through said idler wheel; and means for selectively displacing said carriage along said track member to control the rotational speed of said turntable.

5. A driving system for a phonograph turntable comprising: a driving disc positioned parallel to said turntable for rotation about an axis disposed radially of the axis of rotation of said turntable and supported for axial displacement; an idler wheel interposed between the adjacent surfaces of said turntable and said disc; a movable carriage supporting said idler wheel at one end and having an elongated track-engaging member at the opposite end; an elongated track member providing a path of movement for said carriage such that said idler wheel travels substantially in a plane including the axes of rotation of said turntable and said disc, one of said members having a V-shaped portion and the other having an edge portion received by said V-shaped portion to permit pivotal movement of said carriage with respect to said track, and the junction of said edge portion and said V-shaped portion being disposed in a plane parallel to said turntable and including the rotational axis of said idler wheel; resilient means urging said disc along its axis to complete a driving connection to said turntable through said idler wheel; and means for selectively displacing said carriage along said track member to control the rotational speed of said turntable.

6. A driving system for a phonograph turntable comprising: a driving disc positioned parallel to said turntable for rotation about an axis disposed radially of the axis of rotation of said turntable and supported for axial displacement; an idler wheel interposed between the adjacent surfaces of said turntable and said disc; a movable carriage supporting said idler wheel at one end and having an elongated track-engaging member at the opposite end; a track member including a pair of V-shaped portions for receiving said track-engaging member of said carriage to permit pivotal movement of said carriage with respect to said track, said V-shaped portions being displaced from one another to provide a path of movement for said carriage such that said idler wheel travels substantially in a plane including the axes of rotation of said turntable and said disc; resilient means urging said disc along its axis to complete a driving connection to said turntable through said idler wheel; and means for selectively displacing said carriage along said track member to control the rotational speed of said turntable.

7. A driving system for a phonograph turntable comprising: a driving disc positioned parallel to said turntable for rotation about an axis disposed radially of the axis of rotation of said turntable and supported for axial displacement; an idler wheel interposed between the adjacent surfaces of said turntable and said disc; a movable carriage supporting said idler wheel at one end and having an elongated track-engaging member at the opposite end; an elongated track member providing a path of movement for said carriage such that said idler wheel travels substantially in a plane including the axes of rotation of said turntable and said disc, one of said members having a V-shaped portion and the other having an edge portion received by said V-shaped portion to permit pivotal movement of said carriage with respect to said track; resilient means biasing said edge portion and said V-shaped portion toward one another to maintain a high-friction connection therebetween resilient means urging said disc along its axis to complete a driving connection to said turntable through said idler wheel; and means for selectively displacing said carriage along said track member to control the rotational speed of said turntable.

8. A driving system for a phonograph turntable comprising: a driving disc positioned parallel to said turntable for rotation about an axis disposed radially of the axis of rotation of said turntable and supported for axial displacement; an idler wheel interposed between the adjacent surfaces of said turntable and said disc; a movable carriage supporting said idler wheel at one end and having an elongated track-engaging member at the opposite end; an elongated track member providing a path of movement for said carriage such that said idler wheel travels substantially in a plane including the axes of rotation of said turntable and said disc, one of said members having a V-shaped portion and the other having an edge portion received by said V-shaped portion to permit pivotal movement of said carriage with respect to said track; a driving motor, including a drive shaft, supported for movement from inactive position to an active position in which said shaft is in mechanical driving engagement with the periphery of said disc; resilient means movable from an inactive position to an active position in which said disc is urged along its axis to complete a driving connection to said turntable through said idler wheel; means for simultaneously displacing said resilient means and said motor between said active and inactive positions; and means for selectively displacing said carriage along said track member to control the rotational speed of said turntable.

9. A driving system for a phonograph turntable comprising: an axially movable shaft disposed parallel to but radially displaced from the axis of rotation of said turntable; a driving disc rotatably supported at one end of said shaft and positioned parallel to said turntable; an idler wheel interposed between the adjacent surfaces of said turntable and said disc; a movable carriage supporting said idler wheel at one end and having an elongated track-engaging member at the opposite end; an elongated track member providing a path of movement for said carriage such that said idler wheel travels substantially in a plane including the axes of rotation of said turntable and said disc, one of said members having a V-shaped portion and the other having an edge portion received by said V-shaped portion to permit pivotal movement of said carriage with respect to said track; a driving motor, including a drive shaft, supported for movement from inactive position to an active position in which said shaft is in mechanical driving engagement with the periphery of said disc; a leaf spring movable from an inactive position to an active position in engagement with the other end of said shaft for biasing said shaft in a direction to urge said disc along its axis and complete a driving connection to said turntable through said idler wheel; means for simultaneously displacing said spring and said motor between said active and inactive positions; and means for selectively displacing said carriage along said track member to control the rotational speed of said turntable.

RALPH A. MULLANEY.

REFERENCES CITED

The following references are of record in the file of this patent:

UNITED STATES PATENTS

| Number | Name | Date |
|---|---|---|
| 246,366 | Borchardt | Aug. 30, 1881 |
| 837,828 | Hasselquist | Dec. 4, 1906 |